March 2, 1937.   W. LOTTRITZ   2,072,173
SHOCK ABSORBER
Filed Aug. 3, 1936
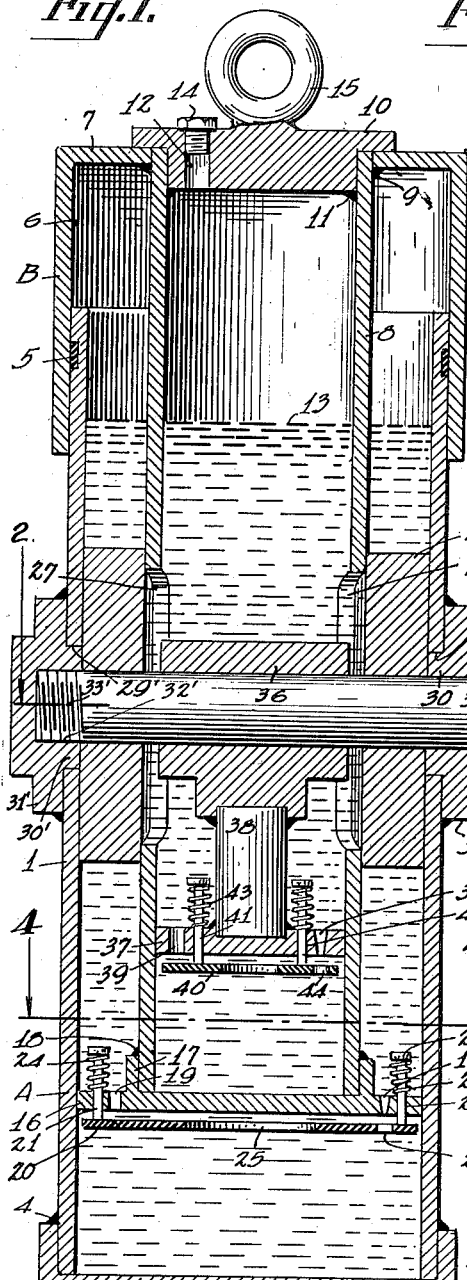
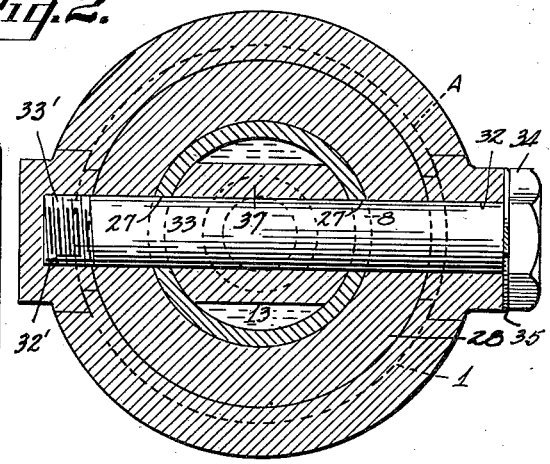
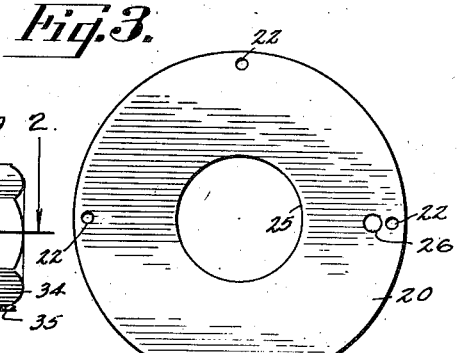
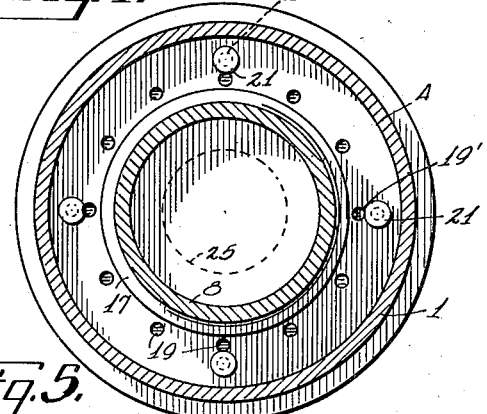
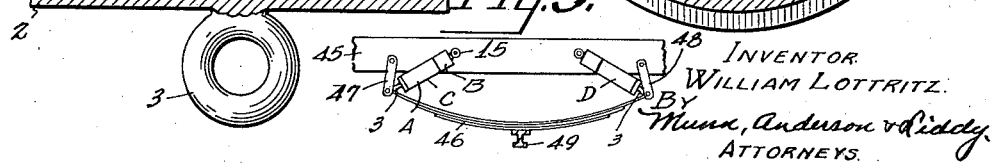
INVENTOR.
WILLIAM LOTTRITZ.
BY Munn, Anderson & Liddy.
ATTORNEYS.

Patented Mar. 2, 1937

2,072,173

UNITED STATES PATENT OFFICE 2,072,173

SHOCK ABSORBER

William Lottritz, San Francisco, Calif.

Application August 3, 1936, Serial No. 93,979

5 Claims. (Cl. 188—88)

My invention relates to improvements in shock absorbers, and it consists of the combinations, constructions and arrangements hereinafter described and claimed.

An object of my invention is to provide a shock absorber which is double-acting in that it makes use of retarding means for causing the parts to move slowly toward each other during the actual absorbing of a shock, and then to move away slowly from each other during the recoil of the spring subsequent to the shock. The device also is direct acting in that it may be placed between two moving parts and act upon these parts to cause them to move slowly toward and away from each other.

The device makes use of a double dash pot for retarding the movement of the parts toward and away from each other, and the device also has a by-pass for permitting the fluid to readily gain access to either of the dash pots. The device has a closed lower end with no moving parts, such as piston rods and the like moving through the closed end. The fluid in both dash pots is placed in the closed end. This obviates the necessity of providing a packing gland around a moving part such as a piston rod to prevent the fluid from leaking along the surface of the rod. In the present device there is no chance for leakage even though the device is double-acting.

The device is extremely simple in construction, and is durable and efficient for the purpose intended.

Other objects and advantages will appear in the following specification, and the novel features of the device will be particularly pointed out in the appended claims.

My invention is illustrated in the accompanying drawing forming a part of this application, in which Figure 1 is a vertical section through the device;

Figure 2 is a section along the line 2—2 of Figure 1;

Figure 3 is a plan view of one of the flap valves;

Figure 4 is a section along the line 4—4 of Figure 1; and

Figure 5 is a diagrammatic view showing two of the devices applied to a leaf spring and the chassis of a vehicle.

In carrying out my invention I provide a lower cup-shaped casing indicated generally at A and an upper casing indicated generally at B. The casing A comprises a cylindrical member 1 closed at its bottom by a cap 2. The cap has a ring 3 formed integral therewith. The cap is permanently secured to the sleeve by any means desired, such as by welding 4. Near the top of the cap I provide a gasket or ring 5 that slidably contacts with a cylindrical wall 6 of the casing B.

The casing B is formed from the cylindrical wall 6 and this wall carries an inwardly extending flange 7 to which a tubular member 8 is secured by welding 9 or other suitable fastening means. A cap 10 closes the top of the tubular member and is fastened thereto by welding 11. The cap has an inlet opening 12 for receiving the fluid 13 and the opening 12 is closed by means of a cap screw 14. The cap 10 carries an integral ring 15 similar to the ring 3.

The parts A and B are free to move toward and away from each other, the cylinders 6 telescoping with the cylinder 1 during this movement. I will first describe the means for retarding the movement of the parts A and B toward each other. A piston 16 is secured to the lower end of the tube 8. Figure 1 shows the piston provided with a flange 17 that telescopes over the lower end of the tube 8, and this flange is permanently secured to the tube by welding 18. The piston has a plurality of holes 19 therein, see Figures 1 and 4. One of these openings 19' is tapered down to a knife edge, see Figure 1. A flap valve 20 is in the shape of a disc and is slidably secured to the piston 16 by bolts 21. Figure 3 shows the flap valve 20 as being provided with four openings 22 for receiving the bolts 21. The bolts 21 are slidably received in openings 23 in the piston 16. Springs 24 are mounted on the bolts 21 and urge the flap valve 20 into closed position, i. e. into a position contacting with the under surface of the piston. Figures 1 and 3 show the disc 20 provided with a large central opening 25 and an opening 26 that is designed to register with the opening 19'.

Figure 1 shows the fluid 13 filling the tube 8 up to a predetermined height. The tube 8 has elongated slots 27 therein and this will permit the fluid to flow past the slots and into the cylinder 1. The fluid will fill the closed end of the casing A and the piston 16 acts upon that portion of the fluid disposed between it and the cap 2.

It will be seen from the construction thus far described that when the casings A and B are moved toward each other, the piston 16 will be moved downwardly in the cylinder 1. The fluid will start to flow through the openings 19 and 19' and this will cause the flap valve 20 to close all of the openings 19. The fluid then will bleed through the opening 26 and the opening 19'.

This will retard the movement of the casing B toward the casing A, and therefore the device will act as a shock absorber during the movement of the casings toward each other. When the casings are moved away from each other, the flap valve 20 will be spaced from the piston 16 with the result that the fluid will pass readily from a position above the piston to the space therebelow by means of the openings 19 and 19'. The piston and flap valve will not act as a retarding means when the casings A and B are moved away from each other.

I provide a second piston and flap valve for retarding the movement of the casings A and B away from each other. A spacing and supporting collar 28 is mounted in the cylinder 1 and acts as a bearing for the movement of the tube 8. The cylinder 1 has two aligned openings 29 and 29' formed therein, and these receive the bosses 30 and 30' of supporting members 31 and 31'. The member 31 has an opening 32 therein for receiving a bolt 33, while the member 31' has a threaded recess 32' for receiving the threaded portion 33' of the bolt. The head 34 of the bolt is held against rotation by means of a lock washer 35.

A block 36 is carried by the bolt 33, and this block in turn supports a piston 37 by means of a connecting member 38. The member 38 is welded to the block 36 and the piston 37 in the manner shown. The piston has a number of radially disposed openings 39 similar to the openings 19. One of the openings 39' is provided with a knife-shaped lower end in the same manner as the opening 19'. A flap valve 40 is supported by bolts 41, and these are slidably received in openings 42 in the piston 37. Springs 43 urge the flap valve 40 into contact with the under surface of the piston 37 for closing the opening 39. The flap valve 40 has an opening 44 similar to the opening 26, and this opening 44 registers with the opening 39'.

It will be seen from this construction that when the casings A and B are moved away from each other, the piston 37 will be moved downwardly in the tube 8 against the fluid disposed between the piston and the closed end of the tube. This will cause the flap valve 40 to close and the trapped fluid then must bleed through the openings 44 and 39' in passing the piston. This will act as a retarding means for slowing up the movement of the casings A and B away from each other.

From the foregoing description of the various parts of the device, the operation thereof may be readily understood.

In Figure 5 I show two of the devices indicated at C and D connected to a vehicle chassis 45 and to a leaf spring 46. The leaf spring is secured to the chassis by spring shackles 47 and 48 and rests upon an axle 49. The rings 15 of the devices C and D are pivotally connected to the chassis while the rings 3 of the same devices are pivotally connected to the free ends of the spring 46.

When the vehicle passes over an obstruction in the road a tendency of the wheel, not shown, in passing over the obstruction is to violently move the axle 49 toward the chassis 45. This will cause the spring 46 to move upwardly and to increase its effective length for swinging the shackles 47 and 48 about their pivots on the chassis 45. This movement will tend to elongate the shock absorbers C and D with the result that the piston 37 will be driven downwardly in the tube 8. The flap valve 40 will come into play immediately, and will permit the fluid to slowly bleed through the openings 44 and 39'. This will cause the shock absorbers C and D to slowly lengthen and thereby react on the spring 46 for preventing the spring from being violently moved toward the chassis. During the lengthening of the shock absorbers C and D the piston 16 is allowed to freely move away from the cap 2 because the disc or flap valve 20 will move away from the piston and permit the fluid to pass readily through the openings 19 and 19'.

After the wheel of the vehicle has passed over the obstruction it has a tendency to be returned quickly to normal position by the action of the spring 46. This tendency of the spring to return quickly to normal position is retarded by the same shock absorbers C and D because the parts A and B of the shock absorbers will be moved toward each other. This will cause the flap valve 20 to close the openings 17 in the piston 16 and the fluid trapped beneath the piston will be forced through the restricted opening 19'. This will cause the parts A and B to move slowly toward each other with the result that the spring 46 will be prevented from quickly resuming its normal position. During the movement of the parts A and B toward each other, the piston 37 moves away from the bottom of the tube 8 and the flap valve 40 opens and permits the ready flow of fluid through the openings 39 and 39'.

The slots 27 not only receive the bolt 33 and thus limit the overall movement of the parts A and B toward and away from each other, but the slots also permit the fluid 13 to pass from the tube 8 into the cylinder 1, and thus both dash pots are provided with a sufficient quantity of liquid. It will be seen that both dash pots are disposed at the lower end of the device, and that there is no moving part extending into a space where the fluid is subjected to compression. This does away with the necessity of providing packing glands for the moving piston rods which is the usual practice in shock absorbers.

Where the spring is rigidly held at one end to the vehicle, only one shock absorber need be used and this connects the movable spring end with the vehicle frame.

While I have shown only the preferred form of my invention, it should be understood that various changes or modifications may be made within the scope of the appended claims without departing from the spirit of the invention.

I claim:

1. A shock absorber comprising two telescoping members, one member carrying a piston slidable in the other member, a liquid trapped in the said other member when the two members are moved toward each other, means carried by the piston for allowing the liquid to slowly bleed thereby for retarding the movement of the members toward each other, the other member carrying a piston slidable in the first member, a liquid trapped in the first member by the second piston when the two members are moved apart, and means carried by the second piston for allowing the liquid to slowly bleed thereby for retarding the movement of the members apart.

2. A shock absorber comprising a member for holding a liquid in its closed end, a second member slidable over the first and carrying a piston active on the liquid, means carried by the piston for allowing the liquid to bleed past the piston for retarding the movement of the members toward each other, said second member having a hollow chamber with a liquid in its closed end, a second piston connected to the first member and being slidable in the chamber for trapping the liquid therein when the members are moved apart, and means carried by the second piston for allowing the liquid to bleed thereby for retarding the movement of the members away from each other.

3. A shock absorber comprising a casing with an open top and a closed bottom, a second casing telescoping over the open end of the first and having a closed top, a piston carried by the second casing and being slidably received in the first, said first casing carrying a liquid in its bottom, the piston trapping the liquid when the casings are moved toward each other, and means carried by the piston for slowly by-passing the fluid past the piston for causing the casings to slowly move toward each other, a liquid-holding chamber carried by the second casing, a second piston carried by the first casing and being slidable in the chamber, said second piston trapping the liquid in the chamber when the casings are moved apart, and means carried by the second piston for slowly by-passing the fluid in the chamber past the piston for causing the casings to slowly move away from each other.

4. In a shock absorber, a cup-shaped member designed to hold a liquid in its bottom, a second cup-shaped member telescoping with the first member, a piston carried by the second member and trapping the liquid in the first when the parts are moved toward each other, means for slowly bleeding the trapped liquid past the piston for slowing up the movement of the members together, said second member having a chamber depending into the first member and containing a liquid in its bottom, a second piston carried by the first member and trapping the liquid in the chamber when the parts are moved apart, and means for slowly bleeding the trapped liquid in the chamber past the second piston for slowing up the movement of the members apart.

5. In a shock absorber, a cup-shaped member, a casing telescoping with respect to the member and carrying a tubular member receivable in the cup-shaped member, a piston closing the end of the tubular member and trapping a fluid in the cup-shaped member when the casing is moved toward the cup-shaped member, and a second piston carried only by the side wall of the cup-shaped member and being slidable in the tube, said second piston trapping a fluid between it and the end closed by the first piston when the cup-shaped member is moved away from the casing.

WILLIAM LOTTRITZ.